Figure 4:
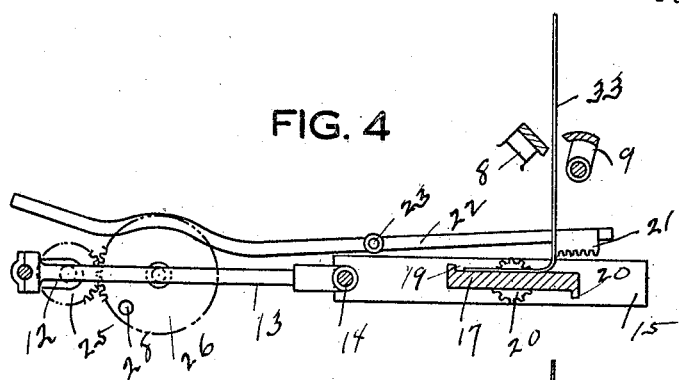

W. BOEHM.
MACHINE FOR FOLDING NOODLES.
APPLICATION FILED APR. 12, 1920.
1,373,293.
Patented Mar. 29, 1921.
2 SHEETS—SHEET 1.
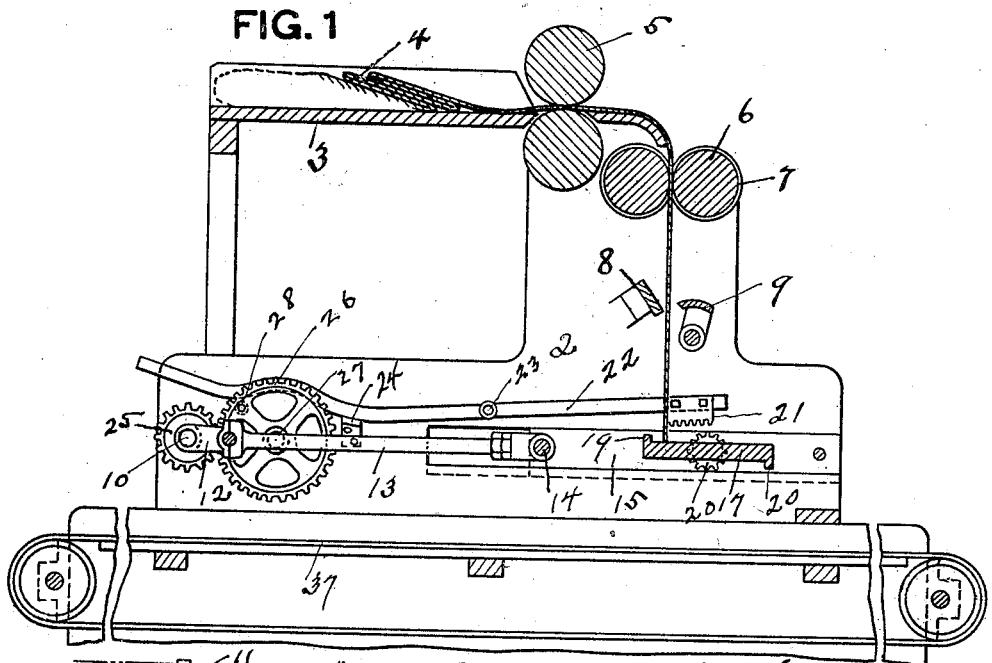
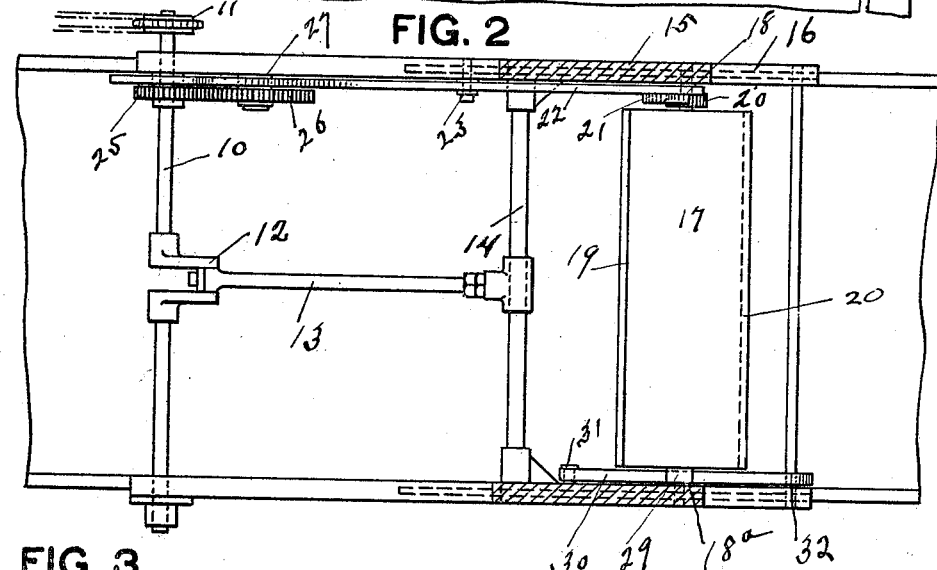
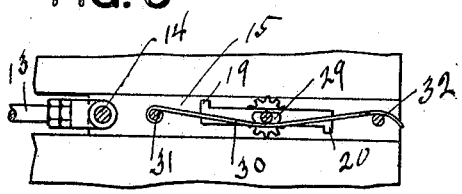
INVENTOR
Wendelin Boehm
By Kay & Tatum
attys

W. BOEHM.
MACHINE FOR FOLDING NOODLES.
APPLICATION FILED APR. 12, 1920.

1,373,293.

Patented Mar. 29, 1921.
2 SHEETS—SHEET 2.

INVENTOR
Wendelin Boehm
By Kay & Totten
attys

UNITED STATES PATENT OFFICE.

WENDELIN BOEHM, OF PITTSBURGH, PENNSYLVANIA.

MACHINE FOR FOLDING NOODLES.

1,373,293.

Specification of Letters Patent.  Patented Mar. 29, 1921.

Application filed April 12, 1920. Serial No. 373,256.

*To all whom it may concern:*

Be it known that I, WENDELIN BOEHM, a citizen of the United States, and resident of Pittsburgh, in the county of Allegheny and State of Pennsylvania, have invented a new and useful Improvement in Machines for Folding Noodles; and I do hereby declare the following to be a full, clear, and exact description thereof.

My invention relates to a machine for folding noodles, or any other article to which the invention may be found applicable.

The object of my invention is to provide a machine by means of which the noodles may be folded back and forth in convenient shape for handling or packing, the machine operating continuously thereby losing no time and capable of folding noodles in large quantities.

To these ends my invention comprises the novel features hereinafter set forth and claimed.

In the accompanying drawings, Figure 1 is a side view partly in section of my improved machine; Fig. 2 is a longitudinal sectional view taken on a line just above the table showing the mechanism for reciprocating said table and inverting same; Fig. 3 is an enlarged detail; and Figs. 4, 5 and 6 and 7 show the different positions of the folding mechanism in the operation of folding.

In the accompanying drawings, the numeral 2 designates a suitable frame in which the several parts of the machine are mounted. At the top of the frame is the table 3 which supports the rolled dough 4 which is to be fed to the machine.

A pair of feed-rolls 5 is provided through which the dough passes and by which it is fed to the cutting rolls 6. These are the ordinary rolls used for slitting the dough to form the noodles and said rolls are provided with the cutters 7. Below the slitting rolls 6 are the cutting knives 8 and 9 which are timed to cut the noodles into suitable lengths, as more fully hereinafter set forth.

A shaft 10 is journaled in suitable bearings, said shaft having at one end the sprocket wheel 11 which is connected up to any suitable source of power for driving the shaft 10.

The shaft 10 has the double-crank 12 to which the pitman 13 is connected, and the opposite end of said pitman is connected up to the cross-arm 14 which in turn is connected to the sliding-frame 15 adapted to move back and forth in the guides 16.

Mounted on the sliding frame 15 is the folding-table 17 which is trunnioned by the trunnions 18, 18ᵃ in said guide-frame. The folding-table 17 has the oppositely extending flanges 19 and 20 on opposite sides thereof.

Mounted on one of the trunnions 18 of the folding-table 17 is the pinion 20 which is adapted to be engaged at proper intervals by the rack 21 secured to the inner end of the rod 22 which is pivotally mounted at 23 and normally rests on the stop 24 in which position the rack 21 is held out of engagement with the pinion 20.

Mounted on the shaft 10 is the spur-gear 25 which meshes with the gear-wheel 26 on the stub-shaft 27. An idler 28 is carried by the gear-wheel 26 and said idler is adapted to engage the rod 22 to lift its outer end for the purpose more fully hereinafter set forth.

In order to hold the folding-table 17 from tilting when the noodles are being folded thereon one of the trunnions 18ᵃ is provided with the enlargement 29 which is engaged by the spring 30 secured at one end around the pin 31 passing under said enlargement and over the pin 32. In this manner the folding-table 17 is permitted to be inverted by overcoming the pressure of the spring 30, but when in a horizontal position is held against the tilting.

Figure 5:
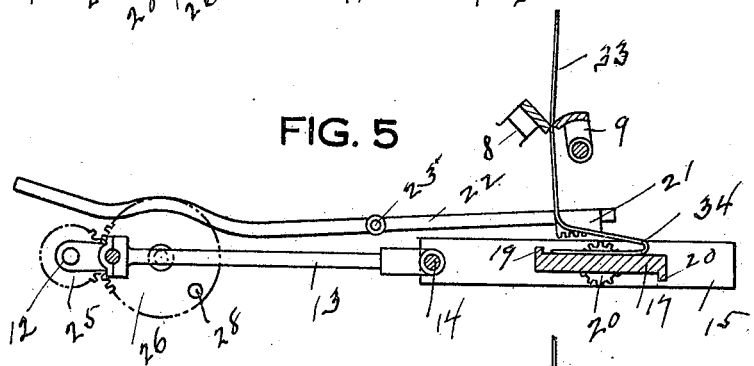
Figure 6:
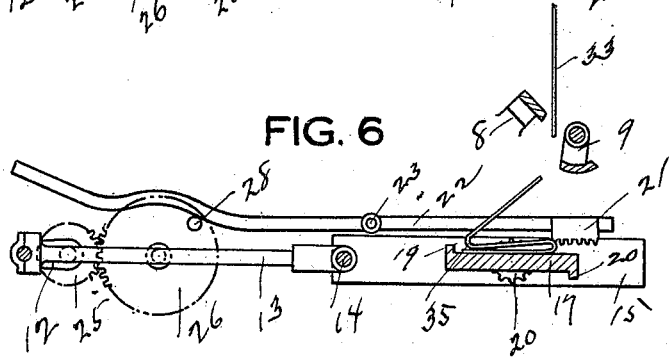
Figure 7:
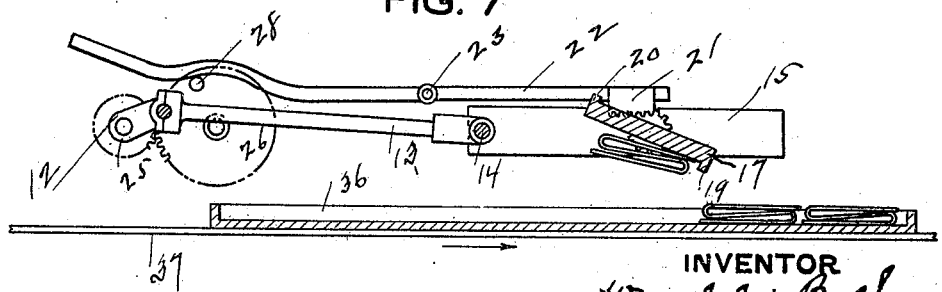

In folding noodles with my machine, the dough is cut by the rolls 7 into noodles 33 which hang down between the cutters 8 and 9 and are supported at their lower end upon the folding-table 17 when the parts are in the position shown in Fig. 1, just as the folding-table 17 is timed to move toward the left as indicated in Fig. 4 when the lower end of the noodles strike the folding-table, as indicated in Fig. 1. As the folding table 17 moves to the left, the first layer of noodles are laid thereon in a horizontal position as indicated in Fig. 4. On the next half-turn of the pinion 25, the movement of the folding-table 17 is reversed and it moves to the right as indicated in Fig. 5 for laying the second layer of noodles, the loop being formed at 34. At this point the cutters 8 and 9 are timed to operate and they sever the noodles from the main body, and just at this moment the folding table 17 starts on its movement to the left again whereby the last layer of noodles drops down in position on the second layer forming the loop 35. The gear-wheel 26 makes one revolution to two of the spur-gear 25, and when the last layer has been deposited on the folding-table, the idler 28 comes around and engages the bar 22 lifting the outer end of said bar and lowering the rack 21 into engagement with the pinion 20. The folding-table 17 is about to make its return stroke to the right when the pinion 20 is engaged by the rack 21 and said folding-table is inverted to the position indicated in Fig. 7, whereby the folded noodles are deposited on the tray 36 carried by the endless-belt 37.

In this manner the noodles as they are folded on one side of the folding-table 17 are deposited in the pan or tray 36 whereupon the opposite face is brought around in position to receive the next set of noodles and the operation continues without interruption, the pan 36 when filled being removed and another one placed in position without stopping the operation. The noodles are formed accurately and with great rapidity, and a great output can be obtained by the operation of a single machine. The noodles are formed with a loop at each end thereby separating them and preventing the sticking of the same along their entire faces.

What I claim is:

1. In a machine for folding noodles and the like, the combination of a single invertible folding-table, means for depositing the noodles thereon, means for cutting said noodles, means for reciprocating said folding table, and means for inverting same.

2. In a machine for folding noodles and the like, the combination of a single invertible folding-table, means for depositing the noodles thereon, means for cutting said noodles, means for reciprocating said table, means for inverting same, and means for holding the table in horizontal position.

3. In a machine for folding noodles, the combination of a single invertible folding-table, means for reciprocating said table, means for depositing the noodles on said table, means for cutting said noodles, a pinion carried by said table, a rack-bar normally out of engagement with said pinion, and means operated by said first-named means for moving said rack-bar into engagement with said pinion.

4. In a machine for folding noodles, the combination of a single trunnioned folding-table, means for depositing the noodles thereon, means for cutting said noodles, means for reciprocating said table, means for inverting said table, an enlargement at one end of said table, and a spring secured at one end passing under said enlargement and a support for said spring at the other end.

5. In a machine for folding noodles, the combination of a single invertible folding-table, a pitman connected to said table, a pinion, connections between said pinion and said pitman, a gear-wheel engaged by said pinion, a projection on said gear-wheel, a pivotally mounted bar engaged by said projection, a rack at the opposite end of said bar, a pinion on said table adapted to be engaged by said bar, whereby the engagement of said pinion by said rack bar will act to invert said table.

In testimony whereof I, the said WENDELIN BOEHM, have hereunto set my hand.

WENDELIN BOEHM.

Witnesses:
 ROBT. D. TOTTEN,
 JOHN F. WILL.